United States Patent
Chikkanayakanahally et al.

(10) Patent No.: US 9,934,107 B1
(45) Date of Patent: Apr. 3, 2018

(54) DESIGNATING BACKUP NODES AND BACKING UP IN PARALLEL IN A HIGH-AVAILABILITY ENVIRONMENT

(71) Applicant: EMC IP Holding Company LLC, Hopkinton, MA (US)

(72) Inventors: Manjesh Venkatanarayana Chikkanayakanahally, Bangalore (IN); Sunil Yadav, Bangalore (IN); Anupam Chakraborty, Bangalore (IN); Nikhil Ambastha, Bangalore (IN); Elango Chockalingam, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 243 days.

(21) Appl. No.: 14/673,317

(22) Filed: Mar. 30, 2015

(51) Int. Cl.
*G06F 7/00* (2006.01)
*G06F 17/00* (2006.01)
*G06F 11/14* (2006.01)

(52) U.S. Cl.
CPC .............................. *G06F 11/1464* (2013.01)

(58) Field of Classification Search
CPC ........... G06F 11/1458; G06F 17/30864; G06F 17/30578; G06F 11/1464

USPC .......................... 707/610, 613, 620, 652, 654
See application file for complete search history.

(56) References Cited

U.S. PATENT DOCUMENTS

| | | | |
|---|---|---|---|
| 9,311,330 B1* | 4/2016 | Chockalingam .. | G06F 17/30212 |
| 9,405,634 B1* | 8/2016 | Ambastha ........... | G06F 11/1464 |
| 9,524,217 B1* | 12/2016 | Chockalingam .... | G06F 11/1458 |
| 2012/0239616 A1* | 9/2012 | Cunningham .... | G06F 17/30578 707/620 |
| 2016/0188421 A1* | 6/2016 | Karinta ............... | G06F 11/1471 707/654 |

* cited by examiner

*Primary Examiner* — Md I Uddin
(74) *Attorney, Agent, or Firm* — Staniford Tomita LLP

(57) ABSTRACT

A high-availability cluster includes a subset of nodes having database instances where each database instance hosts a primary replica having primary databases or a secondary replica having corresponding secondary databases. An availability group includes a primary replica hosted by one database instance on one node and at least one secondary replica hosted by another database instance on another node, the secondary replica being a failover for the primary replica. A first backup preference is determined for a first availability group to identify a first preferred node for a first backup. A second backup preference is determined for a second availability group to identify a second preferred node for a second backup. The backups are triggered on the preferred nodes and the backups can proceed in parallel.

20 Claims, 8 Drawing Sheets

US 9,934,107 B1

DESIGNATING BACKUP NODES AND BACKING UP IN PARALLEL IN A HIGH-AVAILABILITY ENVIRONMENT

TECHNICAL FIELD

The present invention relates generally to the field of backing up computer data, and, more particularly, to systems and techniques for backing up in a high-availability environment.

BACKGROUND

High-availability clusters (also known as HA clusters or fail over clusters) are groups of computers that support server applications that can be reliably utilized with a minimum of down-time. They operate by using high availability software to harness redundant computers in groups or clusters that provide continued service when system components fail. Without clustering, if a server running a particular application crashes, the application will be unavailable until the crashed server is fixed. HA clustering remedies this situation by detecting hardware faults, software faults, or both and immediately restarting the application on another redundant system without requiring administrative intervention, a process known as failover.

There still exists, however, a need to perform backups in a high availability environment because backups provide other benefits. For example, backups can allow for rollbacks to older points in time, remote data storage, archiving, and other benefits.

A problem with prior approaches to backing up high-availability systems is the inability to configure backup preferences and have backups proceed in parallel. Depending upon factors such as the amount of data to backup and other factors, backups can take a significant amount of time and computing resources. In some cases a user may desire to have backups proceed on one or more redundant computers in the high-availability cluster rather than on the server actively responding to client requests.

Therefore, there is a need for improved systems and techniques that allow for parallel backups and the offloading of backups to redundant computers in a high-availability cluster.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
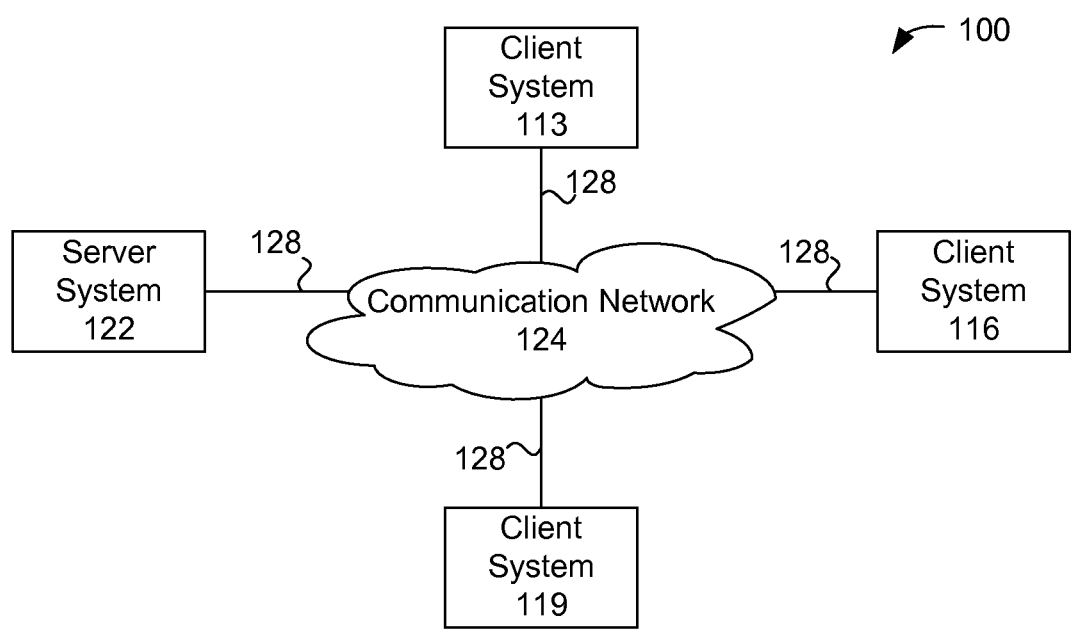
FIG. 1 shows a block diagram of a client-server system and network in which an embodiment of the system may be implemented.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

FIG. 1 is a simplified block diagram of a distributed computer network 100 in which an embodiment of the system may be implemented. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

In an embodiment, a user interfaces with the system through a computer workstation system. The computer system may include a monitor, screen, cabinet, keyboard, and mouse. The cabinet houses familiar computer components such as a processor, memory, mass storage devices, input/output (I/O) controller, display adapter, serial or universal serial bus (USB) port, network interface, speaker, and the like.

Mass storage devices may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on a mass storage device. The source code of the software may also be stored or reside on a mass storage device (e.g., hard disk, magnetic disk, tape, or CD-ROM). As a further example, code may be transmitted via wires, radio waves, or through a network such as the Internet.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or any other appropriate programming language). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows 8, or Windows Server), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 2:
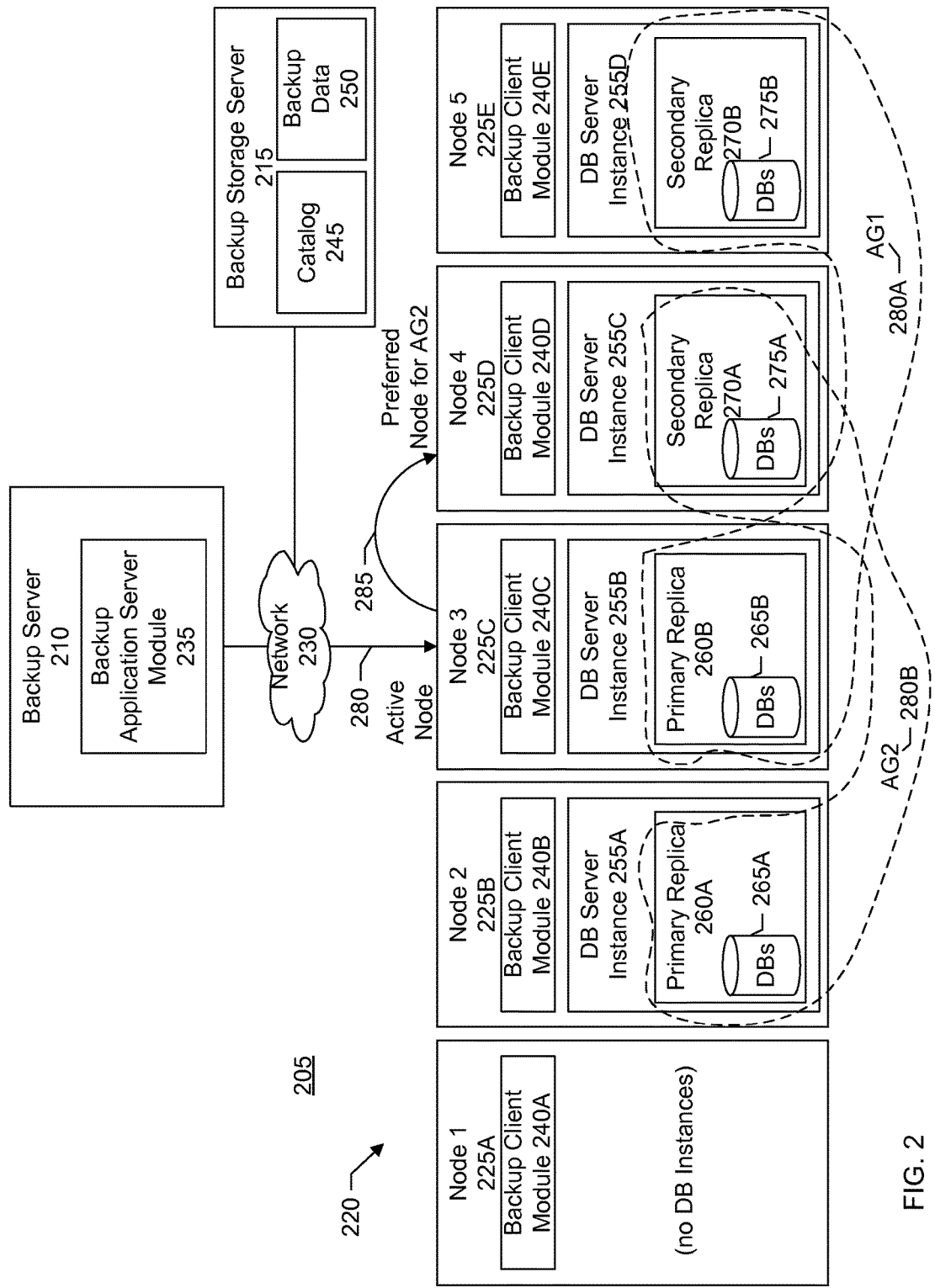
FIG. 2 shows an overall architecture of a system for backup and recovery in a high-availability environment.

FIG. 2 shows a system 205 for backing up and recovering high-availability databases. This system includes a backup server 210, a backup storage server 215, and a cluster 220 of backup client nodes such as first, second, third, fourth, and fifth nodes 225A-E, each of which are connected through a communication network 230. The communication network may be as shown in FIG. 1 and described above. The servers, nodes, or both can be general purpose computers having hardware and software as described above in the discussion accompanying FIG. 1. Although FIG. 2 shows a specific number servers and backup nodes, it should be appreciated that there can be any number of servers, nodes, or both.

The system includes a backup application that includes a backup application server module 235 and a backup application client module. The backup application client module may be installed on each of the nodes to be backed up. In the example shown in FIG. 2, backup application client modules 240A-E have been installed on nodes 225A-E, respectively. The backup application client and server modules communicate with each other to backup data on the node to the backup storage server. The data can be stored on the backup server, remote from the cluster, for later recovery. The backup application may provide for features such as rollbacks or recovering system states to previous points-in-time.

In some cases, a computing environment will include a cluster of nodes hosting a high-availability database system. Two or more of the nodes may be redundant. There can be an active or primary node and an inactive, non-active, passive, or secondary node. An active node can be a node of the cluster that is servicing client requests, actively servicing database requests, accessing the hosted database for read-write requests, managing a resource group, or combinations of these. A passive node can be a node in the cluster that is idle or in a listening state or mode.

If the active node fails, the other node can assume the responsibilities of the failed node. This type of failover helps to ensure the availability of data, applications, services, and so forth. In a specific embodiment, benefits of the system include the ability to have a backup be performed on a particular node such as a secondary node so that computing resources on the active node can continue to service other client requests, the ability to perform backups in parallel, and an improved user experience when configuring backups.

More particularly, in a high-availability environment a first node in the cluster may host a database instance which in turn hosts a set of primary databases. These primary databases can be available for read-write connections from clients. The node having the primary databases may be referred to as an active node. A second node in the cluster may host another database instance which in turn hosts a set of corresponding secondary databases. The secondary databases are synchronized with the primary databases and may or may not be made available for read-only access.

The primary and secondary databases may be part of group (which may be referred to as an availability group (AG)) in which the secondary databases serve as potential failover targets. An availability group can support a failover environment for a discrete set of user databases, which may be referred to as availability databases that fail over together. In a specific embodiment, an availability group supports a set of read-write primary databases and one to four sets of corresponding secondary databases. Optionally, secondary databases can be made available for read-only access, some backup operations, or both. During a failover the secondary databases on a particular node can transition to become the primary databases. Once the former secondary databases are brought online or made available as primary databases, client applications can then connect to them for read-write access. The former primary databases, when they become available, can transition to become the secondary databases.

A problem with traditional backup applications with respect to the above-described high-availability environment includes the inability to have backup preferences such as designating a preferred node for a backup. For example, a backup that is performed on the active node may be undesirable because computing resources that could otherwise be servicing client requests will be occupied by the backup operation. The lack of computing resources for the client requests could then lead to a severe degradation in the performance of the active node. Further, traditional backup applications do not support backing up multiple availability groups.

In a specific embodiment, a feature of the system provides for the ability to designate and trigger a backup on a preferred node, and parallel backups of different availability groups. Such backups may be referred to as federated backups. More specifically, below are some benefits of the system in various scenarios:

1) There is no need to configure backups against each node having availability groups. Instead, a backup can be configured against a cluster name (e.g., Windows cluster name) and the system architecture can take backups of all the availability group databases in the cluster.

2) Active node of the cluster may or may not contain the availability group database to be backed up. The system can automatically discover and backup the appropriate availability group database.

3) Preferred node for backup for a given availability group could be different from the specified saveset. A saveset includes a set of data being backed up in a backup operation (e.g., databases, files, or directories). In particular, the specified saveset can specify the database instance name (e.g., instance name of SQL Server) and the name of the database. However, an AlwaysOn group database can failover to another server anytime. So, the preferred node of the AlwaysOn group database can change dynamically.

4) Multiple AGs can be configured for backup.

The system improves performance and is simple for users (e.g., administrators) to configure and use. In a specific embodiment, a backup is always triggered from a preferred node for the availability group irrespective of where the backup is spawned. The architecture determines the appropriate backup node dynamically and triggers the backup accordingly. A backup of all the databases which are in the cluster (e.g., Windows cluster) can be configured. "Normal Restores" are supported as well in addition to "Copy restores" for backups taken from other nodes. In a specific embodiment, a "Normal Restore" refers to backing up on a node (e.g., Node 1) and restoring on that node (e.g., Node 1) by involving the SQL Server Writer (or other appropriate writer). In this specific embodiment, a "Copy Restore" refers to a restore done without involving the SqlServerWriter (or other appropriate writer). A "Normal Restore" involves validation of the writer (e.g., SqlServerWriter), whereas in the case of a "Copy Restore" there is no validation. In a specific embodiment, the default restore is the "Normal Restore." However, under some circumstances, a "Copy Restore" may be performed when, for example, the SQL Server is not installed on the same machine or when the user desires a copy of the database on another machine.

Referring now to FIG. 2, the backup storage server may include disk, tape, a deduplication storage system (e.g., EMC Data Domain), or combinations of these. The backup storage server includes a catalog 245 and data backed up 250 from the client nodes. The backed up data may include a volume, portion of a volume, applications, services, user-generated or user data, logs, files, directories, databases, operating system information, configuration files, machine data, system data, and so forth.

The catalog provides an index of the data stored on the backup storage server. The catalog may include metadata associated with the backup such as an identification of the savesets or files stored on the backup storage server (e.g., globally unique identifier (GUID) of a backed up database), the time and date of backup, size of the backup, an identification of the backup source, a manifest (e.g., a file manifest for a backed up database may include a location of the database, and a location of the backed up log files), file aliases and original file paths, a flag indicating the data was backed up from a shadow copy volume, type of backup performed (e.g., block-based backup (BBB) versus traditional save—a traditional save typically includes opening a file, reading the file, and closing the file; a block-based backup reads a disk space as blocks and generally does not require opening and closing files which can then allow for a faster backup), information required for restoring or recovering the backup, and so forth. The catalog can track and index various shadow copy snapshots and provide for the recovery of individual items.

In a specific embodiment, the system provides for backing up Microsoft SharePoint® data that is stored in Microsoft SQL Server® databases, a file-system, a registry, or combinations of these, where the SQL Server database has been configured with Microsoft AlwaysOn Availability Groups. SharePoint® and SQL Server® are products by provided by Microsoft Corporation of Redmond, Wash. SharePoint® is a web application framework and platform. Organizations use SharePoint® to create websites. The websites can be used as a secure place to store, organize, share, and access information. SQL Server® is a relational database management system (RDBMS).

Microsoft SQL Server provides a feature referred to as AlwaysOn Availability Groups which is a high-availability solution that provides an enterprise-level alternative to database mirroring. Introduced in SQL Server 2012, AlwaysOn Availability Groups helps to maximize the availability of a set of user databases for an enterprise.

SharePoint can be configured to use Microsoft SQL AlwaysOn Groups so that SharePoint systems can avail the benefits of AlwaysOn Groups. SharePoint can store its databases on multiple SQL Servers. Some databases can be stand-alone, some databases may be in one availability group, and other databases can be in other availability groups. In a specific embodiment, the system can backup stand-alone databases (e.g., databases not in an availability group), databases in a first availability group, and databases in a second availability group, different from the first availability group. The backups can be in parallel. For example, while or during the backing up of the databases in the first availability group, the databases in the second availability group may be backed up.

Microsoft SharePoint Foundation uses a shadow copy service referred to as Volume Shadow Copy Service (VSS) to simplify backup and restore operations. A shadow copy service such as VSS helps to provide a consistent image of a dataset such as a file system and application so that it can be backed up by the backup application. For example, in many cases it would be desirable to perform a backup while the client computer is in use (e.g., when there may be open files that are being written to) in order to reduce or minimize the amount of downtime. Modifying data while a backup is running, however, can result in a corrupt backup.

Figure 3:
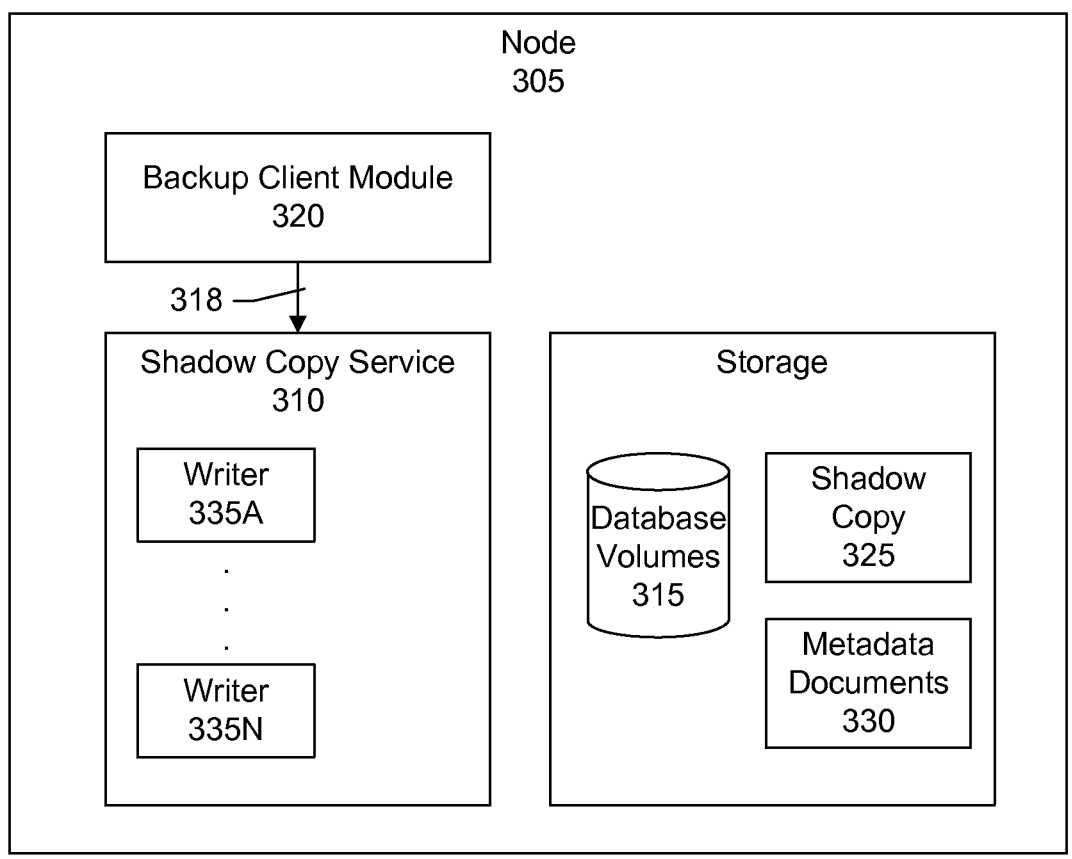
FIG. 3 shows a block diagram of a node of a cluster having a shadow copy service.

More particularly, FIG. 3 shows a block diagram of a client node 305 of a high-availability cluster of nodes having a shadow copy service 310. The shadow copy service facilitates the creation of a snapshot of data such as a volume or volume of files 315 upon a request 318 from a requestor such as a backup application client module 320. Once a shadow copy 325 has been created, the backup application client module can copy data from the shadow copy to the backup storage along with any metadata documents 330 associated with the shadow copy and thus create a backup of the volume. The metadata documents may include information necessary to a backup or restore operation. Once the backup has been created, the shadow copy may be deleted from the client storage.

In a specific embodiment, the shadow copy service includes components including writers 335A . . . N to help ensure logically-consistent open file backups. There may be a writer for each application to be backed up by the backup application client module. For example, there may be an Exchange Writer, SQL Server Writer, Hyper-V Writer, and so forth. A writer is responsible for functions such as quiescing the corresponding application and data stores to be backed up (e.g., temporarily freezing application I/O write requests) and flushing the cache for shadow copy generation, and thawing the application and data stores after the shadow copy is generated. A writer may further create or facilitate the creation of a description of the backup components, a data restoration process, or both. The information can be used by the backup application to determine how to backup and restore or recover the data.

Specifically, the SharePoint VSS Writer (SPF-VSS Writer) has native support for creating consistent shadow copies by coordinating with business applications, file-system services, backup applications and storage hardware. The SPF-VSS Writer enables a requestor to select all databases, a segment of the databases (multiple select), or a single database (single select) for both backup and restore operations.

In a specific embodiment, a feature of the system integrates with the VSS framework to provide a method to backup SharePoint Content databases which are configured with SQL AlwaysOn Groups. Some benefits of a specific embodiment of the system having AlwaysOn within a SharePoint environment include more granularities in managing databases as a group; support for alternative availability modes (asynchronous and synchronous) on group replicas; support for automatic, manual, and forced client failover; and better utilization of server hardware by offloading read workloads to a secondary instance.

As discussed above, a feature of the system provides for triggering a backup on a preferred node. Offloading workloads and backups from the active node can improve performance on the primary replica of the active node.

Referring now to FIG. 2, in a specific embodiment cluster 220 includes a set of databases instances 255A-D. A node of a cluster may or may not host a database instance. In the example shown in FIG. 2, first node 225A of the cluster does not host a database instance but there is a subset of nodes hosting database instances. In particular, second node 225B hosts a first database instance 255A. Third node 225C hosts a second database instance 255B. Fourth node 225D hosts a third database instance 255C. Fifth node 225E hosts a fourth database instance 255D. In this example, each database instance hosts one of a primary replica having one or more primary databases or a secondary replica having one or more secondary databases.

For example, first database instance 255A on second node 225B hosts a first primary replica 260A. The first primary replica hosts a first set of primary databases 265A. Second database instance 255B on third node 225C hosts a second primary replica 260B. The second primary replica hosts a second set of primary databases 265B.

Third database instance 255C on fourth node 225D hosts a first secondary replica 270A. The first secondary replica hosts a first set of secondary databases 275A. Fourth database instance 255D on fifth node 225E hosts a second secondary replica 270B. The second secondary replica hosts a second set of secondary databases 275B.

The cluster may include one or more availability groups. In the example shown in FIG. 2, there is a first availability group 280A and a second availability group 280B. Each availability group includes a primary replica and at least one secondary replica. For example, the first availability group includes second primary replica 260B and second secondary replica 270B. The second availability group includes first primary replica 260A and first secondary replica 270A.

In a specific embodiment, each availability group includes a single primary replica and one, two, three, or four secondary replicas. For example, an availability group may include a primary replica having primary databases and hosted by a first node in a cluster of nodes, a first secondary replica having a first set of corresponding secondary databases and hosted by a second node in the cluster of nodes, a second secondary replica having a second set of corresponding secondary databases and hosted by a third node in the cluster of nodes. Thus, in this example, the availability group includes one primary replica hosted by the first node, and two secondary replicas hosted by the second and third nodes, respectively. In another specific embodiment, there can be more than one primary replica, more than four secondary replicas, or both.

Each replica of a given availability group may reside on a different node of the same cluster. An availability group may fail over at the level of an availability replica. An availability replica may provide redundancy at the database level—for the set of databases in one availability group. The primary replica makes the primary databases available for read-write connections from clients. To synchronize the primary and secondary databases, the primary replica sends transaction log records of each primary database to every secondary database. Every secondary replica caches the transaction log records (hardens the log) and then applies them to its corresponding secondary database. Data synchronization can occur between the primary database and each connected secondary database, independently of the other databases. Thus, a secondary database can be suspended or fail without affecting other secondary databases, and a primary database can be suspended or fail without affecting other primary databases.

In a specific embodiment, the database instances include Microsoft SQL Server instances, the cluster includes a Windows Server Failover Clustering (WSFC) cluster, and the availability groups are Microsoft AlwaysOn Availability Groups deployed in a WSFC cluster.

Figure 4:
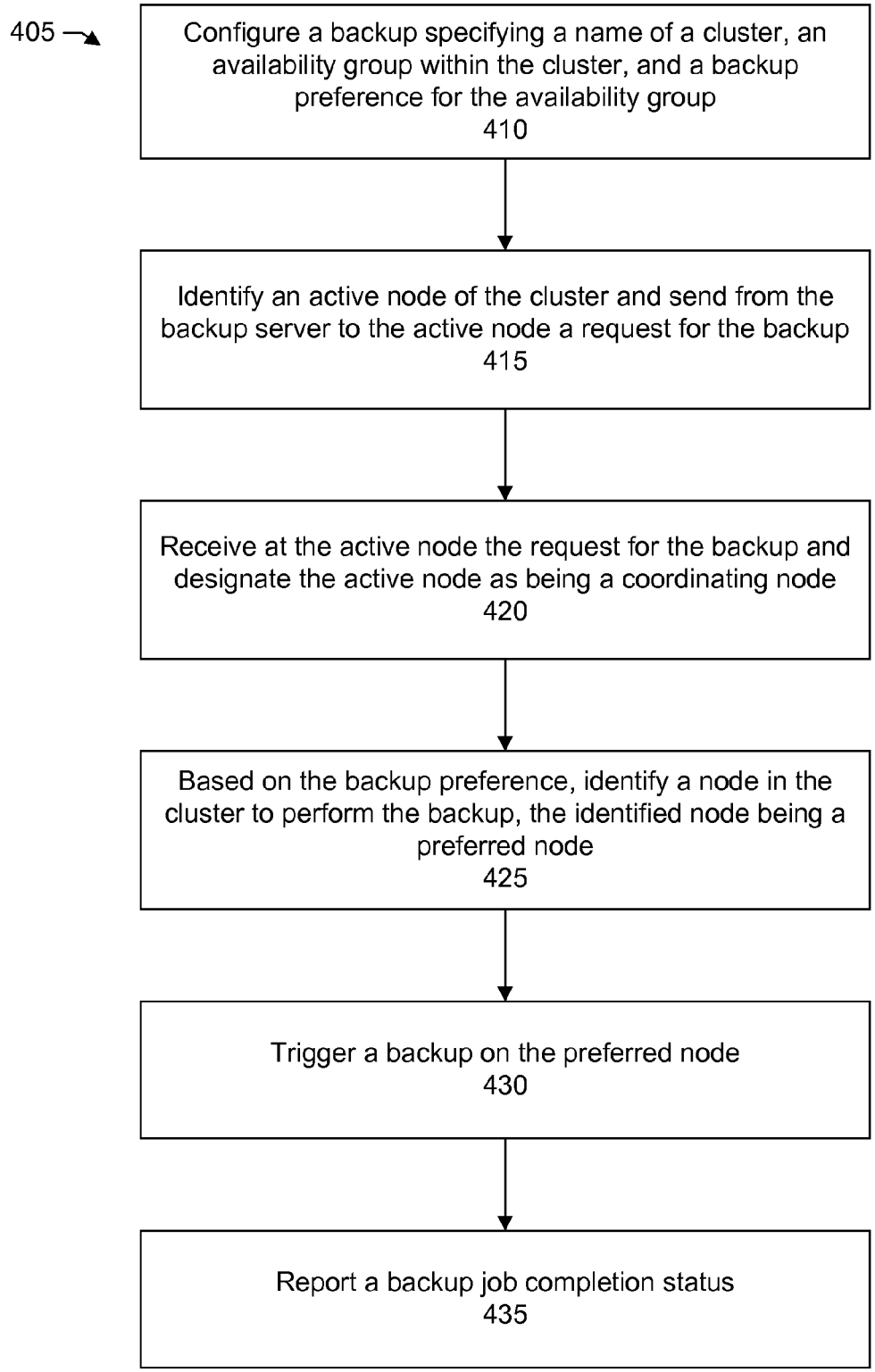
FIG. 4 shows an overall flow diagram of the system.

FIG. 4 shows an overall flow 405 for backing up in a high-availability environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data. In a specific embodiment, the architecture shown in FIG. 2 is capable of performing one or more steps or operations of the flow in an "AlwaysOn" environment.

In a step 410 (FIG. 4), a backup is configured. The configuration may specify a name of a cluster, an availability group within the cluster to backup, a backup preference for the availability group, or combinations of these.

In a specific embodiment, the configuration may be specified through a user interface or graphical user interface (GUI) provided by the backup application such as by the backup application server module. A user (e.g., administrator) may access the interface to configure the backup against the cluster name (e.g., Windows cluster name) rather than having to configure backups against each node having an availability group. For example, using the GUI, the administrator may input a name of the cluster. The ability to configure backups against the cluster name rather than against each node helps to simplify backup configurations. The user can configure any database in an availability group which exists in the cluster for backup.

The backup preference may be stored by the backup server and can include information specifying where the backup should be performed. For example, the backup preference may include information specifying a preferred node on which backups should be performed, information specifying the replica upon which backups should be performed, information specifying a priority for performing a backup on a particular replica of an availability group relative to other replicas in the availability group, information specifying a preference for backups on a particular replica type (e.g., prefer backups on secondary replica or prefer backups on primary replica), information specifying a requirement for backups on a particular replica type (e.g., backups on secondary replicas only), information specifying a backup window, or combinations of these. The system can provide a configurable default backup preference. The backup preference may be stored in one or more files by the backup application. The files may be formatted as Extensible Markup Language (XML) files or any other file format as desired. Copies of the backup preference may be stored at the backup server, one or more nodes of the cluster, or both.

In a step 415, the system identifies an active node of the cluster. Specifically, during a backup, the system discovers the active node of the cluster and then designates that node as the coordinating node for the federated backup. In a specific embodiment, the backup is referred to as a SQL federated backup or SQL VSS federated backup. A request for the backup is sent from the backup server to the active node. In a step 420, the request is received at the active node and the active node is designated a coordinating node. The backup request may be a general command to backup an entire cluster. Alternatively, the instruction may specify one or more availability groups, one or more databases in an availability group, all databases, a segment of the databases, a single database, or combinations of these.

In a step 425, the system analyzes, examines, or consults the backup preference. Based on the backup preference, the system identifies a node in the cluster to perform the backup. The identified node for the backup may be referred to as a preferred node.

In a step 430, a backup is triggered on the preferred node. In a specific embodiment, the active (or coordinating node) coordinates with the backup server application module to trigger the backup on the preferred node. For example, in a specific embodiment, the active (or coordinating) node may send to the backup server an identification of the preferred node. The backup server, in turn, may generate a backup job request that the backup server sends to the preferred node. In another specific embodiment, the active (or coordinating) node may send the backup job request to the preferred node.

The backup application module (e.g., server module, client module, or both) may include one or more processes for determining the preferred node in the cluster for backups. In a specific embodiment, a process includes checking whether any database instance (e.g., SQL instance) hosting the availability group to backup (e.g., "AG1") is present or not on the active node.

If the instance hosting the desired availability group (e.g., "AG1") on the node is not found, a process is launched on the clustergroup owner node for the given availability group (e.g., "AG1"). The process returns the preferred node for the given availability group or groups.

Alternatively, if the instance hosting the desired availability group (e.g., "AG1") on the node is found the system logins into that instance to get or obtain the preferred node for the availability group.

Once the preferred node for the availability group is found the systems triggers the backup on the preferred node. The federated backups can be performed at the availability group or database level. Backups can be configured such that multiple backups are triggered on the same node and are run in parallel. There can be multiple backups in parallel on different nodes.

In a step 435, a backup job completion status is reported. The backup job completion status may be sent from the preferred backup node to the active or coordinating node. The active or coordinating node can forward the status to the backup server.

Figure 5:
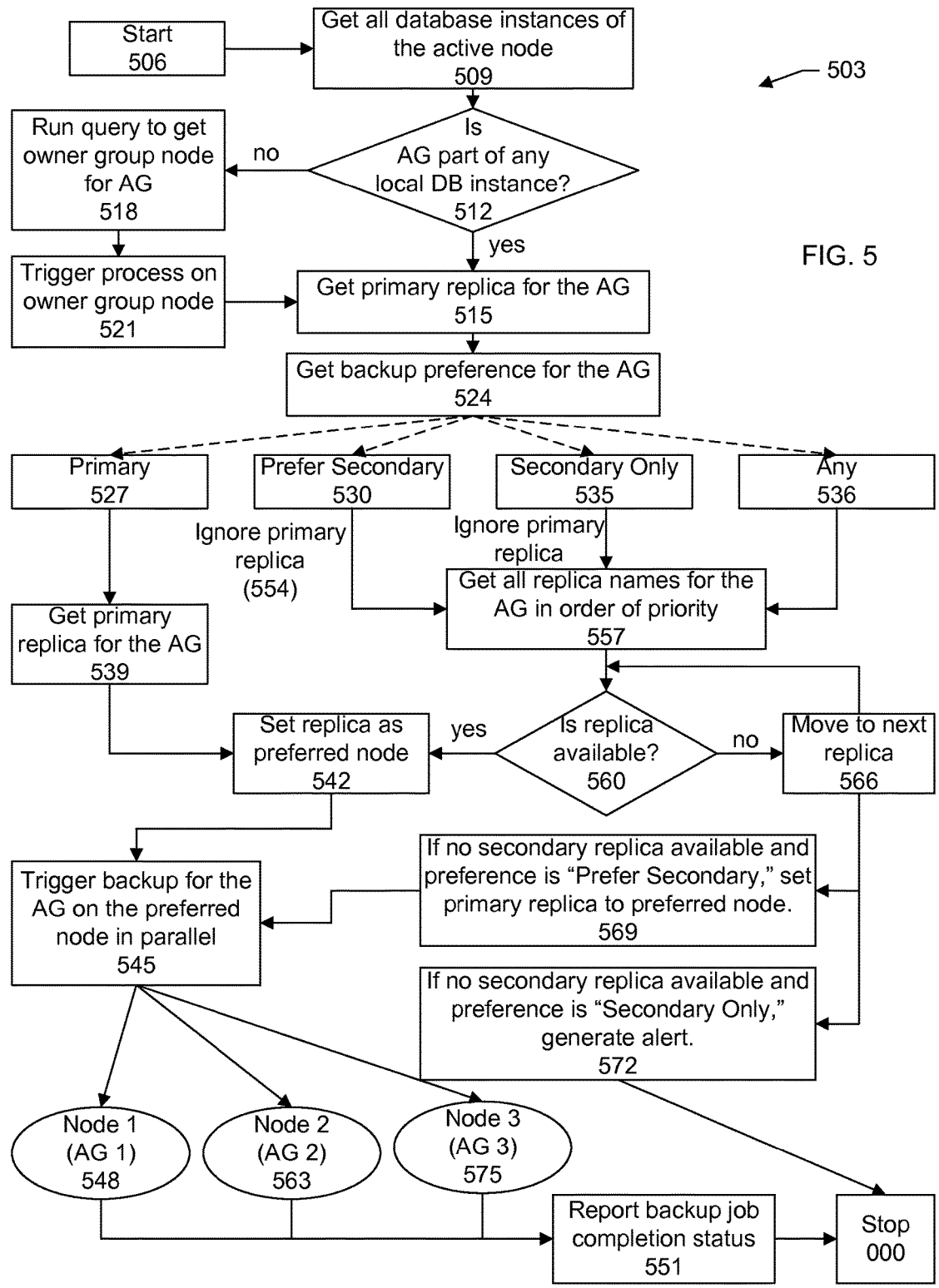
FIG. 5 shows a more detailed flow diagram for identifying a preferred backup node.

FIG. 5 shows a more detailed flow 503 of a specific embodiment for identifying and backing up on a preferred node. In a step 506, a backup operation is requested by the backup server. The request is sent from the backup server to an active node of the cluster of nodes. In a step 509, the system identifies all the database instances (e.g., SQL Server database instances) of the active node. In a step 512, a determination is made as to whether the availability group to be backed up is part of any local database instances. If the availability group is part of a local database instance, the associated primary replica for the availability group is identified (step 515).

Alternatively, if the availability group is not part of any local database instance a query is run to obtain the owner group node for the availability group so as to obtain the primary replica (step 518). In a specific embodiment, the query includes a PowerShell query. PowerShell is a task automation and configuration management framework provided by Microsoft. In a step 521, a process is triggered on the owner group node for the availability group identified in step 518. The primary replica for the availability group is then obtained (step 515). In other words, a query (e.g., PowerShell) may be executed to determine or identify the owner of the availability group so that a backup agent can be spawned on that node of the availability group.

In a step 524, the system determines the backup preference for the availability group to be backed up. In a specific embodiment, the backup preference may specify a preference for backups on the primary replica (527), a preference for backups on the secondary replica (530), a preference (or requirement) for backups on the secondary replica only (533), or a preference for backups on any type of replica (536), e.g., no preference.

In a step 539, if the backup preference specifies backups on the primary replica, the system obtains the primary replica for the availability group to be backed up. In a specific embodiment, the user specifies the name of the instance and the database name for the backup. The primary/secondary node can dynamically change for an availability group (e.g., AlwaysOn group) any time. In a step 542, the replica (e.g., primary replica) is set as the preferred node. In other words, a node of the cluster hosting the primary replica of the availability group to be backed up is designated or identified as being the preferred node for the backup operation.

In a step 545, a backup for the availability group is triggered on the preferred node. For example, if the primary replica of AG 1 is hosted by node 1 (548) then the backup operation is triggered on that node, i.e., the preferred node. In a specific embodiment, the triggering of the backup operation includes the backup client application module on the preferred node notifying a shadow copy service (e.g., VSS) on the preferred node of the backup operation. The shadow copy service can then prepare the databases residing on the preferred node for the backup operation of that database instance hosted by the preferred node.

For example, as described in the discussion accompanying FIG. 3, the shadow copy service may coordinate with the backup application client module to quiesce the databases, gather information or metadata for the backup operation, gather information or metadata for a corresponding recover operation, or combinations of these. The shadow copy service may coordinate with the backup module in the generation of a shadow copy. The shadow copy may be created by the shadow copy service, or some other provider. In a step 551, the backup node (e.g., node 1) reports a backup job completion status to the active or coordinating node.

Alternatively, in a step 554, if the backup preference specifies a preference for the secondary replica (530), the primary replica is ignored or temporarily ignored as a candidate for backup. In a step 557, the system obtains or identifies all replica names for the availability group in order of priority. In a specific embodiment, the identified replicas do not include the primary replica. In another specific embodiment, the identified replicas may include the primary replica. In this specific embodiment, the identified replicas include a list of one or more secondary replicas. The list may order or rank the secondary replicas in an order that indicates the backup priority.

For example, the list may include identifiers for secondary replicas A, B, and C. The secondary replicas may be sorted in backup priority order. For example, secondary replica B may be followed by secondary replica A which may be followed by secondary replica C. The replicas may be listed from highest priority to lowest priority or vice-versa (e.g., lowest priority to highest priority). In the former case, the system examines the replicas for availability by traversing from top to bottom. In the latter case, the system examines the replicas for availability by traversing from bottom to top. The backup priority list may be stored with or separate from the backup preference.

In a step 560, the system determines whether the highest priority replica for backup on the list is available or online for backup. In this example, secondary replica B is the highest priority replica for backup. Thus, the system determines whether secondary replica B is available. If secondary replica B is available the replica is set as the preferred node for backup. In other words, a node of the cluster hosting secondary replica B of the availability group to be backed up is designated or identified as being the preferred node for the backup operation.

In step 545, a backup is triggered on the preferred node. For example, if secondary replica B of AG 2 is hosted by node 2 (563) then the backup operation is triggered on that node. In step 551, the backup node 2 reports a backup job completion status to the active or coordinating node.

In step 560, if secondary replica B is unavailable, the system loops back to examine the next replica in the backup priority list (step 566). In this example, secondary replica A is the next replica having the highest priority. Thus, the system determines whether secondary replica A is available for backup. If the replica is available, the flow proceeds to step 542 and the steps following as shown in FIG. 5 and discussed above. If the replica is unavailable, the system continues to loop through and examine the next replica in the priority list.

In a step 569, if there are no secondary replicas available or online for backup and the backup preference specifies a "preference" for backups on secondary replicas, the system sets the primary replica to the preferred node. In other words, a node of the cluster hosting the primary replica of the availability group to be backed up is designated the preferred node for the backup operation because all secondary replicas were unavailable and the backup preference specified a "preference" (rather than a requirement) for backups on secondary replicas. The flow proceeds to step 545 and the steps following as shown in FIG. 5 and discussed above.

Alternatively, the backup preference may specify backups on secondary replicas only (535). In other words, the backup preference may specify a "requirement" for backups on secondary replicas rather than a "preference." In this case, the flow initially proceeds as shown in FIG. 5 and discussed above. For example, the primary replica is ignored as a candidate for backup and the system proceeds to loop through and examine the secondary replicas of the availability group in backup priority order.

If, however, in a step 572 no secondary replicas are available or online for backup and the preference indicates backups on secondary replicas only, the system generates an alert and does not perform the backup operation. The alert may include an error message indicating that no backup was performed because the backup preference indicated backups on secondary replicas only and all secondary replicas were found to be unavailable or offline for backups. The alert may include an email, text message, news feed item, or other notification, or combinations of these.

A replica may be unavailable or offline for backups for any number of reasons. For example, the node hosting the replica may have suffered a failure or the administrator may have flagged or configured the node to be unavailable for backup.

Alternatively, the backup preference may specify backups on any replica (536). The flow proceeds to step 557 and the steps following as shown in FIG. 5 and discussed above. For example, the backup priority list may specify a backup priority order as secondary replica B, secondary replica A, secondary replica C, secondary replica D, and primary replica. The system traverses the list to examine in priority order which replica is available or online for backup and the flow proceeds as shown in FIG. 5 and discussed above.

As discussed backups of availability groups can proceed in parallel, concurrently, simultaneously, or in conjunction with other backups. For example, while the databases of the replica of the first availability group hosted by the first node (548) are being backed up, the databases of the replica of the second availability group hosted by the second node (563) may also be backed up. Likewise, the databases of the replica of a third availability group hosted by a third node 575 may be backed up in parallel with the backup operations on the first and second node.

Figure 6:
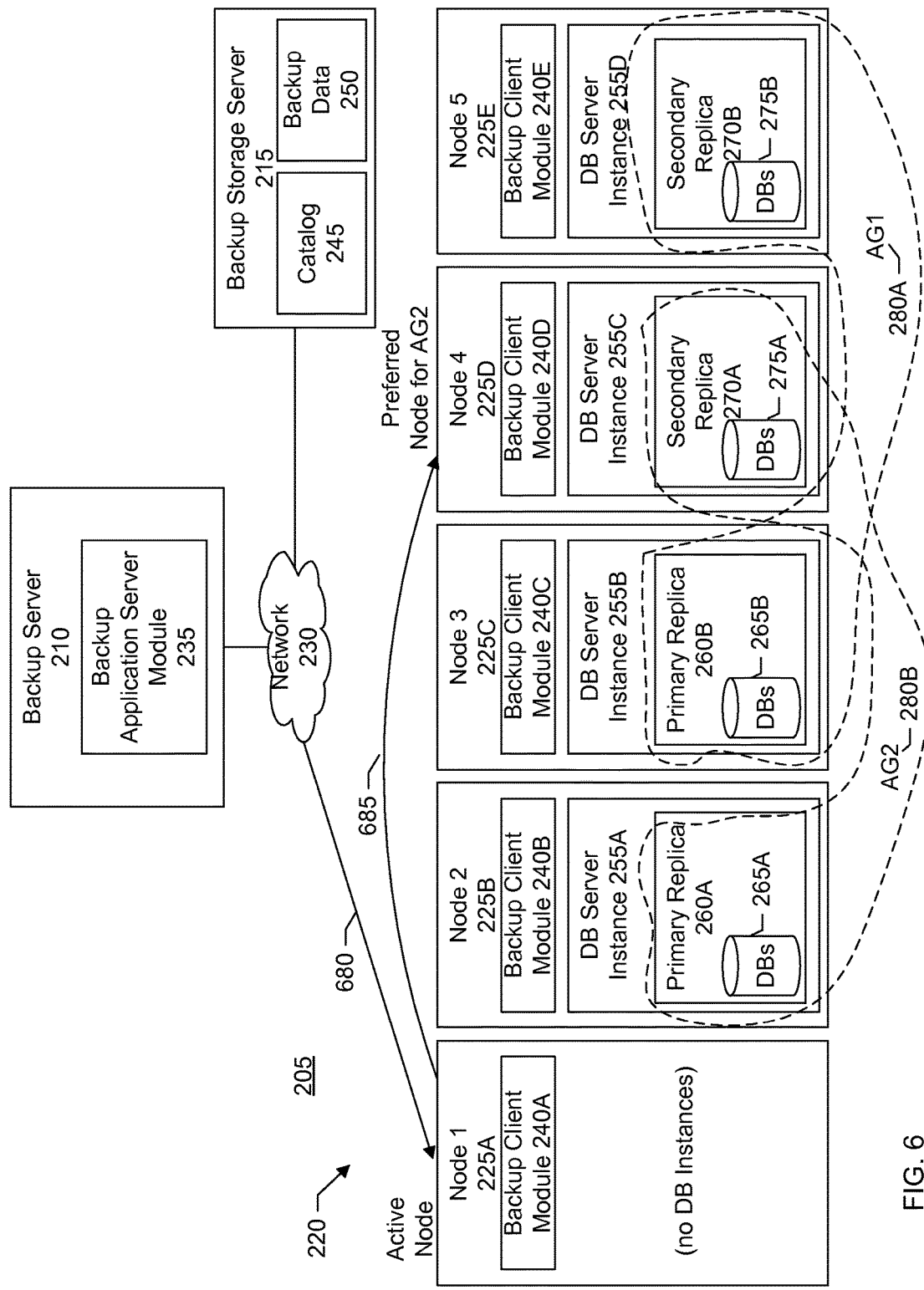
FIG. 6 shows a block diagram of a potential backup scenario.
Figure 7:
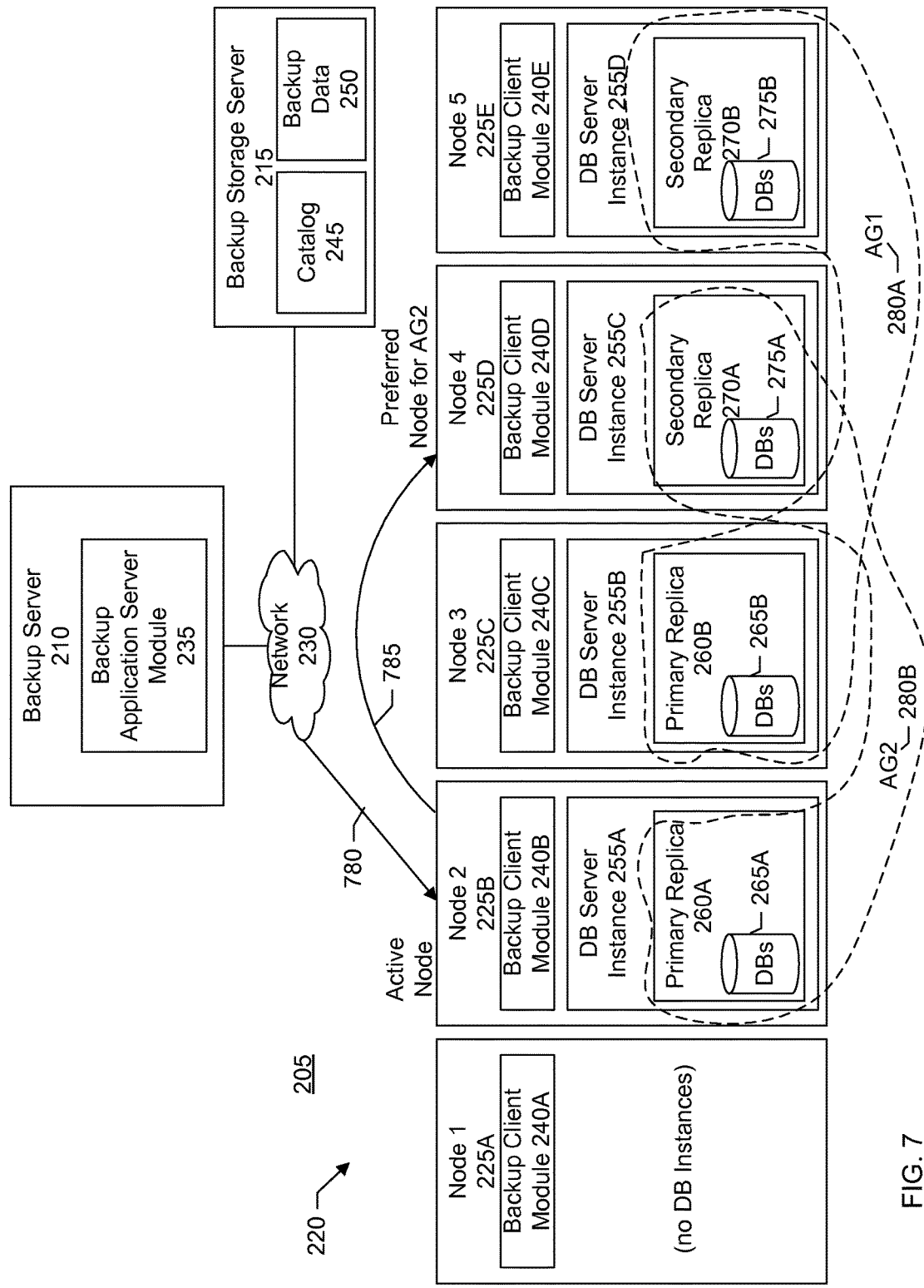
FIG. 7 shows a block diagram of another potential backup scenario.

FIGS. 2 and 6-7 show some different backup scenarios. When a backup is started from the backup server, the backup request lands on or is sent to the active node of the cluster. FIG. 2 shows a scenario in which the active node of the cluster does not host specified availability group to backup (e.g., AG2). A backup request 280 has been sent from the backup server to the active node of the cluster, e.g., node 3. As discussed above, active node 3 will be designated as the coordinating node. In this example, the request specifies for backup availability group 2 (AG2). As shown in the example of FIG. 2, however, node 3 does not include AG2.

The system executes one or more steps of the process shown in FIGS. 4 and 5 and identifies the preferred node for AG2 as node 4. A backup is then triggered 285 on the preferred node for AG2 (e.g., node 4). In a specific embodiment, triggering the backup includes the coordinating node sending the backup instruction identifying the preferred node to the backup server. In turn, the backup server sends or forwards the appropriate backup command to the preferred node. In another specific embodiment, triggering the backup includes the coordinating node sending the command to backup to the preferred node.

FIG. 6 shows a scenario in which the active node of cluster does not have the database (e.g., SQL Server) installed. In other words, the cluster may include a node which does not have SQL installed. If this node happens to be the active node of the cluster at the time of the backup, the backup request will be sent to that node. In the scenario of FIG. 6, node 1 is the active node. Thus, a backup request 680 has been sent from the backup server to the active node of the cluster, e.g., node 1. As discussed above, active node 1 will be designated as the coordinating node. In this example, the request specifies for backup availability group 2 (AG2). As shown in the example of FIG. 6, however, node 1 does not include any database instances (e.g., no SQL instances). The system executes one or more steps of the process shown in FIGS. 4 and 5 and identifies the preferred node for AG2 as node 4. A backup is then triggered 685 on the preferred node for AG2 (e.g., node 4).

FIG. 7 shows a scenario in which the active node of cluster has the availability group specified but the preferred node for backup is different from the active node. In the scenario of FIG. 7, node 2 is the active node. Thus, a backup request 780 has been sent from the backup server to the active node of the cluster, e.g., node 2. As discussed above, active node 2 will be designated as the coordinating node. In this example, the request specifies for backup availability group 2 (AG2). The system executes one or more steps of the process shown in FIGS. 4 and 5 and identifies the preferred node for AG2 as node 4. A backup is then triggered 785 on the preferred node for AG2 (e.g., node 4). For example, node 2 may be hosting a primary replica of AG2, node 4 may be hosting a secondary replica of AG2, and the backup preference for AG2 may have specified backups on replicas of a secondary type. So, the backup is triggered on node 4 which hosts the secondary replica.

Figure 8:
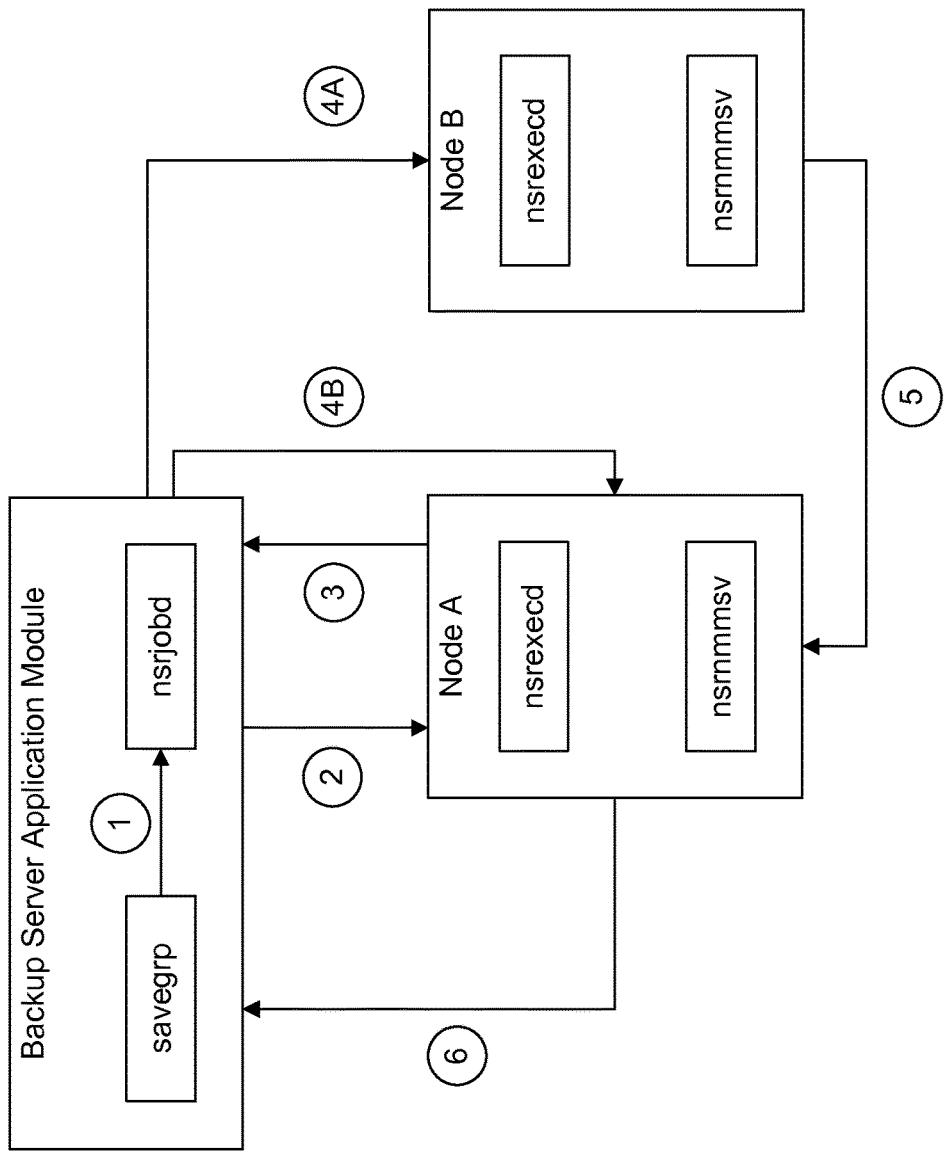
FIG. 8 shows a process flow in a specific embodiment.

FIG. 8 shows a workflow of a specific embodiment of the system in a product referred to as the Networker Module for Microsoft (NMM) as provided by EMC Corporation of Hopkinton, Mass. In the workflow example shown in FIG. 8, there are several processes or daemons referred to as savegrp, nsrjobd, nsrexecd, and nsrnmmsv. The savegrp command runs a group of NetWorker clients through the process of saving their data. The nsrjobd daemon is responsible for starting and monitoring running jobs for NetWorker client backups. The nsrexecd daemon is the client process. This program authenticates and processes the backup server remote execution requests and executes programs on the client to save the client data to the backup storage server. The nsrnmmsv daemon is responsible for determining the preferred node for each availability group database. It should be appreciated that these processes may be referred to using any label or identifier.

In a specific embodiment, the workflow shown in FIG. 8 is as follows:

Step 1: The savegrp uses nsrjobd to start the backup.

Step 2: Nsrjobd sends this job request to nsrexecd on the Cluster Server Alias, (e.g., node A) of the cluster. Nsrexecd forwards this request to nsrnmmsv for further processing.

Step 3: Nsrnmmsv determines the preferred node for each availability group database. For example, the preferred node for AG1 may be on node B. The preferred node for AG2 may be on node A. Nsrnmmsv makes itself a creator job and sends a backup request with the appropriate command for backing up AG1 database on node B and AG2 database on node A in parallel, through nsrjobd on the server.

Step 4A: A first new worker job request is sent to nsrexecd on the node B and nsrexecd forwards it to nsrnmmsv to back up the databases part of AG1 on the node B.

Step 4B: A second new worker job request is sent to nsrexecd on the node A simultaneously.

Step 5: From the command, nsrnmmsv on node B understands it will now act in a slave process capacity. This means it will not process this command further for cluster aware processing; instead it returns the backup completion message to the co-ordinating node. Similarly backup is completed in slave node A and backup completion message is returned back.

Step 6: Upon receiving a completion message of the backup on Node A and B, coordinating nsrnmmsv on node A sets completion status accordingly for the savegrp.

It should be appreciated that while some embodiments are shown and described in conjunction with Microsoft Share-Point and SQL Server, aspects and principles of the system can be applicable to other applications and databases in a high-availability computing environment.

In a specific embodiment, a method includes receiving at a node of a cluster of nodes a request to backup first and second availability groups, wherein each node of a subset of the nodes hosts a database instance of a plurality of database instances, each database instance comprises one primary replica having one or more primary databases, or one secondary replica having one or more corresponding secondary databases, and each availability group comprises a primary replica on one node, and at least one secondary replica on another node, the secondary replica being a failover target for the primary replica; determining a first backup preference for the first availability group to identify a first preferred node; triggering a first backup on the first preferred node to backup one or more databases of a first replica hosted by a first database instance on the first preferred node; determining a second backup preference for the second availability group to identify a second preferred node; and triggering a second backup on the second preferred node to backup one or more databases of a second replica hosted by a second database instance on the second preferred node, wherein the second backup proceeds in parallel with the first backup.

The triggering a first backup may include determining that the node receiving the request to backup does not host the first availability group specified in the request, the first preferred node thereby being different from the node receiving the request to backup.

The triggering a first backup may include determining that the node receiving the request to backup does not have an installation of a database instance of the plurality of database instances, the first preferred node thereby being different from the node receiving the request to backup.

Triggering a first backup may include determining that the node receiving the request to backup hosts the first availability group specified in the request; and determining that the node is not a preferred node for backing up the first availability group, the first preferred node thereby being different from the node receiving the request to backup.

In another specific embodiment, the first backup preference for the first availability group specifies a preference for a node hosting a secondary replica and the method includes determining that a secondary replica of the first availability group is available; based on the determination that the secondary replica is available and the preference for backup on a node hosting a secondary replica, setting a node hosting the secondary replica of the first availability group as the first preferred node, the secondary replica thereby being the first replica, and the one or more databases of the first replica backed up thereby being secondary databases.

In another specific embodiment, the first backup preference for the first availability group specifies a preference for a node hosting a secondary replica and the method includes determining that each secondary replica of the first availability group is unavailable; based on the determination that each secondary replica is unavailable and the preference for backup on a node hosting a secondary replica, setting a node hosting a primary replica of the first availability group as the first preferred node, the primary replica thereby being the first replica, and the one or more databases of the first replica backed up thereby being primary databases.

In another specific embodiment, the first backup preference for the first availability group specifies a requirement for a node hosting a secondary replica and the method includes determining that each secondary replica of the first availability group is unavailable; based on the determination that each secondary replica is unavailable and the requirement for backup on a node hosting a secondary replica, not backing up the one or more databases of the first replica because the first replica is a primary replica; and generating an alert indicating that the first availability group has not been backed up.

In a specific embodiment, there is a system for backing up in a high-availability environment, the system including a processor-based system executed on a computer system and configured to: receive at a node of a cluster of nodes a request to backup first and second availability groups, wherein each node of a subset of the nodes hosts a database instance of a plurality of database instances, each database instance comprises one primary replica having one or more primary databases, or one secondary replica having one or more corresponding secondary databases, and each availability group comprises a primary replica on one node, and at least one secondary replica on another node, the secondary replica being a failover target for the primary replica; determine a first backup preference for the first availability group to identify a first preferred node; trigger a first backup on the first preferred node to backup one or more databases of a first replica hosted by a first database instance on the first preferred node; determine a second backup preference for the second availability group to identify a second preferred node; and trigger a second backup on the second preferred node to backup one or more databases of a second replica hosted by a second database instance on the second preferred node, wherein the second backup proceeds in parallel with the first backup.

In a specific embodiment, there is a computer program product, comprising a non-transitory computer-readable medium having a computer-readable program code embodied therein, the computer-readable program code adapted to be executed by one or more processors to implement a method comprising: receiving at a node of a cluster of nodes a request to backup first and second availability groups, wherein each node of a subset of the nodes hosts a database instance of a plurality of database instances, each database instance comprises one primary replica having one or more primary databases, or one secondary replica having one or more corresponding secondary databases, and each availability group comprises a primary replica on one node, and at least one secondary replica on another node, the secondary replica being a failover target for the primary replica; determining a first backup preference for the first availability group to identify a first preferred node; triggering a first backup on the first preferred node to backup one or more databases of a first replica hosted by a first database instance on the first preferred node; determining a second backup preference for the second availability group to identify a second preferred node; and triggering a second backup on the second preferred node to backup one or more databases of a second replica hosted by a second database instance on the second preferred node, wherein the second backup proceeds in parallel with the first backup.

In another specific embodiment, a method includes receiving a configuration for backing up a cluster of nodes, the configuration specifying a name of the cluster and not specifying a node of the cluster, the configuration being received at an active node of the cluster; identifying a first availability group in the cluster, the first availability group comprising a first primary replica hosted by a first node, and a first secondary replica hosted by a second node, different from the first node, the first secondary replica being a failover target for the first primary replica; identifying a second availability group in the cluster, the second availability group comprising a second primary replica hosted by a third node, and a second secondary replica hosted by a fourth node, different from the third node, the second secondary replica being a failover target for the second primary replica; determining a first preferred node for the first availability group, the first preferred node being one of the first or second node; determining a second preferred node for the second availability group, the second preferred node being one of the third or fourth node; triggering a first backup on the first preferred node; and triggering a second backup on the second preferred node, wherein the first backup is concurrent with the second backup.

The active node may be different from the first preferred node, second preferred node, or both. The active node may be the same as the first preferred node. The first preferred node may be different from the second preferred node. The first preferred node may be the same as the second preferred node.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
configuring a backup against a cluster of nodes having first and second availability groups to backup, and backup preferences for the first and second availability groups;
receiving at a node of the cluster of nodes a request to backup the cluster of nodes,
wherein each node of a subset of the nodes hosts a database instance of a plurality of database instances,
each database instance comprises one primary replica having one or more primary databases, or one secondary replica having one or more corresponding secondary databases, and data synchronization between a primary database and a corresponding secondary database occurs independently of other databases, and
each availability group comprises a primary replica on one node, and at least one secondary replica on another node, the secondary replica being a failover target for the primary replica;
discovering, automatically, which nodes of the cluster of nodes host at least one of the first or second availability groups;
obtaining, from the backup preferences, a first backup preference for the first availability group to identify a first preferred node, the first backup preference specifying one of backing up on a node having a primary replica type, backing up on a node having a secondary replica type, backing up only on a node having the secondary replica type, or backing up on a node having any replica type;
when the first backup preference specifies backing up only on a node having the secondary replica type, determining whether any secondary replicas on nodes of the first availability group are available, and
if all secondary replicas of the first availability group are not available, not performing a first backup of the first availability group;

obtaining, from the backup preferences, a second backup preference for the second availability group to identify a second preferred node;

triggering a second backup on the second preferred node to backup one or more databases of a second replica hosted by a second database instance on the second preferred node, wherein the second backup proceeds in parallel with the first backup when the first backup preference specifies backing up only on a node having the secondary replica type and there is a secondary replica on a node of the first availability group that is available;

storing, in response to the triggered second backup, data from the one or more databases of the second replica at a backup storage server; and reporting a completion status of the request to backup the cluster of nodes, wherein the completion status is sent from a preferred node to an active node to a backup server.

2. The method of claim 1 wherein the triggering a second backup comprises determining that the node receiving the request to backup does not host the second availability group specified in the request, the second preferred node thereby being different from the node receiving the request to backup.

3. The method of claim 1 wherein the triggering a second backup comprises determining that the node receiving the request to backup does not have an installation of a database instance of the plurality of database instances, the second preferred node thereby being different from the node receiving the request to backup.

4. The method of claim 1 wherein the triggering a second backup comprises:
   determining that the node receiving the request to backup hosts the second availability group specified in the request; and
   determining that the node is not a preferred node for backing up the second availability group, the second preferred node thereby being different from the node receiving the request to backup.

5. The method of claim 1 wherein the configuring a backup against a cluster of nodes comprises receiving input from a user, the input specifying a name of the cluster.

6. The method of claim 1 comprising:
   when the first backup preference specifies backing up on a node having the secondary replica type, determining whether any secondary replicas on nodes of the first availability group are available, and
      if all secondary replicas of the first availability group are not available, setting a node hosting a primary replica of the first availability group as the first preferred node.

7. The method of claim 1 wherein the not performing a first backup of the first availability group comprises generating an alert indicating that the first availability group has not been backed up.

8. A system for backing up in a high-availability environment, the system comprising:
   a processor-based system executed on a computer system and configured to:
   configure a backup against a cluster of nodes having first and second availability groups to backup, and backup preferences for the first and second availability groups;
   receive at a node of the cluster of nodes a request to backup the cluster of nodes,
      wherein each node of a subset of the nodes hosts a database instance of a plurality of database instances,
         each database instance comprises one primary replica having one or more primary databases, or one secondary replica having one or more corresponding secondary databases, and data synchronization between a primary database and a corresponding secondary database occurs independently of other databases, and
         each availability group comprises a primary replica on one node, and at least one secondary replica on another node, the secondary replica being a failover target for the primary replica;
   discover, automatically, which nodes of the cluster of nodes host at least one of the first or second availability groups;
   obtain, from the backup preferences, a first backup preference for the first availability group to identify a first preferred node, the first backup preference specifying one of backing up on a node having a primary replica type, backing up on a node having a secondary replica type, backing up only on a node having the secondary replica type, or backing up on a node having any replica type;
   when the first backup preference specifies backing up only on a node having the secondary replica type, determine whether any secondary replicas on nodes of the first availability group are available, and
      if all secondary replicas of the first availability group are not available, not perform a first backup of the first availability group;
   obtain, from the backup preferences, a second backup preference for the second availability group to identify a second preferred node;
   trigger a second backup on the second preferred node to backup one or more databases of a second replica hosted by a second database instance on the second preferred node, wherein the second backup proceeds in parallel with the first backup when the first backup preference specifies backing up only on a node having the secondary replica type and there is a secondary replica on a node of the first availability group that is available;
   store, in response to the triggered second backup, data from the one or more databases of the second replica at a backup storage server; and
   report a completion status of the request to backup the cluster of nodes, wherein the completion status is sent from a preferred node to an active node to a backup server.

9. The system of claim 8 wherein the processor-based system is configured to determine that the node receiving the request to backup does not host the second availability group specified in the request, the second preferred node thereby being different from the node receiving the request to backup.

10. The system of claim 8 wherein the processor-based system is configured to determine that the node receiving the request to backup does not have an installation of a database instance of the plurality of database instances, the second preferred node thereby being different from the node receiving the request to backup.

11. The system of claim 8 wherein the processor-based system is configured to:
   receive input from a user, the input specifying a name of the cluster.

12. The system of claim 8 wherein the processor-based system is configured to:

when the first backup preference specifies backing up on a node having the secondary replica type, determine whether any secondary replicas on nodes of the first availability group are available, and if all secondary replicas of the first availability group are not available, set a node hosting a primary replica of the first availability group as the first preferred node.

13. The system of claim 8 wherein the processor-based system is configured to:

generate an alert indicating that the first availability group has not been backed up.

14. A computer program product, comprising a non-transitory computer-readable medium having a computer-readable program code embodied therein, the computer-readable program code adapted to be executed by one or more processors to implement a method comprising:

configuring a backup against a cluster of nodes having first and second availability groups to backup, and backup preferences for the first and second availability groups;

receiving at a node of the cluster of nodes a request to backup the cluster of nodes, wherein each node of a subset of the nodes hosts a database instance of a plurality of database instances, each database instance comprises one primary replica having one or more primary databases, or one secondary replica having one or more corresponding secondary databases, and data synchronization between a primary database and a corresponding secondary database occurs independently of other databases, and each availability group comprises a primary replica on one node, and at least one secondary replica on another node, the secondary replica being a failover target for the primary replica;

discovering, automatically, which nodes of the cluster of nodes host at least one of the first or second availability groups;

obtaining, from the backup preferences, a first backup preference for the first availability group to identify a first preferred node, the first backup preference specifying one of backing up on a node having a primary replica type, backing up on a node having a secondary replica type, backing up only on a node having the secondary replica type, or backing up on a node having any replica type;

when the first backup preference specifies backing up only on a node having the secondary replica type, determining whether any secondary replicas on nodes of the first availability group are available, and if all secondary replicas of the first availability group are not available, not performing a first backup of the first availability group;

obtaining, from the backup preferences, a second backup preference for the second availability group to identify a second preferred node;

triggering a second backup on the second preferred node to backup one or more databases of a second replica hosted by a second database instance on the second preferred node, wherein the second backup proceeds in parallel with the first backup when the first backup preference specifies backing up only on a node having the secondary replica type and there is a secondary replica on a node of the first availability group that is available;

storing, in response to the triggered second backup, data from the one or more databases of the second replica at a backup storage server; and reporting a completion status of the request to backup the cluster of nodes, wherein the completion status is sent from a preferred node to an active node to a backup server.

15. The computer program product of claim 14 wherein the triggering a second backup comprises determining that the node receiving the request to backup does not host the second availability group specified in the request, the second preferred node thereby being different from the node receiving the request to backup.

16. The computer program product of claim 14 wherein the triggering a second backup comprises determining that the node receiving the request to backup does not have an installation of a database instance of the plurality of database instances, the second preferred node thereby being different from the node receiving the request to backup.

17. The computer program product of claim 14 wherein the triggering a second backup comprises:

determining that the node receiving the request to backup hosts the second availability group specified in the request; and determining that the node is not a preferred node for backing up the second availability group, the second preferred node thereby being different from the node receiving the request to backup.

18. The computer program product of claim 14 wherein the configuring a backup against a cluster of nodes comprises receiving input from a user, the input specifying a name of the cluster.

19. The computer program product of claim 14 wherein the method comprises:

when the first backup preference specifies backing up on a node having the secondary replica type, determining whether any secondary replicas on nodes of the first availability group are available, and if all secondary replicas of the first availability group are not available, setting a node hosting a primary replica of the first availability group as the first preferred node.

20. The computer program product of claim 14 wherein the not performing a first backup of the first availability group comprises generating an alert indicating that the first availability group has not been backed up.

* * * * *